US012205509B2

(12) United States Patent
Yeh et al.

(10) Patent No.: US 12,205,509 B2
(45) Date of Patent: Jan. 21, 2025

(54) METHOD FOR OUTPUTTING GRAYSCALE DATA, DRIVING CONTROLLER AND DISPLAY APPARATUS

(71) Applicant: Novatek Microelectronics Corp., Hsinchu (TW)

(72) Inventors: Chao-Chi Yeh, Miaoli County (TW); Shih-Hsuan Chen, Taoyuan (TW); Chun-Ping Niou, Changhua County (TW)

(73) Assignee: Novatek Microelectronics Corp., Hsinchu (TW)

( * ) Notice: Subject to any disclaimer, the term of this patent is extended or adjusted under 35 U.S.C. 154(b) by 123 days.

(21) Appl. No.: 17/985,901

(22) Filed: Nov. 13, 2022

(65) Prior Publication Data

US 2023/0115938 A1 Apr. 13, 2023

Related U.S. Application Data

(63) Continuation-in-part of application No. 17/496,737, filed on Oct. 7, 2021, now Pat. No. 11,501,687.

(51) Int. Cl.
*G09G 3/20* (2006.01)
*G09G 3/3275* (2016.01)

(52) U.S. Cl.
CPC ......... *G09G 3/2044* (2013.01); *G09G 3/2096* (2013.01); *G09G 3/3275* (2013.01); *G09G 2320/0247* (2013.01)

(58) Field of Classification Search
CPC .. G09G 3/2044; G09G 3/2051; G09G 3/2055; G09G 3/2077; G09G 3/2096; G09G 3/32; G09G 3/3275; G09G 2310/027; G09G 2320/0247; G09G 2320/0271; G09G 3/2048
See application file for complete search history.

(56) References Cited

U.S. PATENT DOCUMENTS 7,084,848 B2 * 8/2006 Senda .................. G09G 3/3659 349/158
7,453,422 B2 * 11/2008 Park ..................... G09G 3/2022 345/60
7,483,574 B2 * 1/2009 Sasaki .................. H04N 19/426 382/232
10,796,623 B2 * 10/2020 Crounse ............... G09G 3/2055
(Continued)

*Primary Examiner* — Vijay Shankar
(74) *Attorney, Agent, or Firm* — JCIPRNET

(57) ABSTRACT

A method for outputting a grayscale data, a driving controller, and a display apparatus are provided. The method includes: in response to receiving a first input grayscale data which is not greater than a first threshold, generating a first output grayscale data without performing a dither computing on the first input grayscale data and outputting the first output grayscale data; in response to receiving a second input grayscale data which is greater than a second threshold, generating a first dithered grayscale data by performing a first dither computing on the second input grayscale data and outputting the first dithered grayscale data as a second output grayscale data. The second threshold is greater than the first threshold, and the second output grayscale data does not comprise any part of the second input grayscale data not processed by the first dither computing.

10 Claims, 6 Drawing Sheets

(56) References Cited

U.S. PATENT DOCUMENTS

| | | | | |
|---|---|---|---|---|
| 2007/0222712 | A1* | 9/2007 | Chiaki ................. | G09G 3/2051<br>345/63 |
| 2008/0272998 | A1* | 11/2008 | Yano .................... | G09G 3/2051<br>345/89 |

* cited by examiner

METHOD FOR OUTPUTTING GRAYSCALE DATA, DRIVING CONTROLLER AND DISPLAY APPARATUS

CROSS-REFERENCE TO RELATED APPLICATION

This application is a continuation-in-part application of and claims the priority benefit of a prior application Ser. No. 17/496,737, filed on Oct. 7, 2021. The entirety of the above-mentioned patent application is hereby incorporated by reference herein and made a part of this specification.

BACKGROUND

Technical Field

The disclosure generally relates to a driving controller. More particularly, the disclosure relates to a method for outputting a grayscale data, a driving controller, and a display apparatus.

Description of Related Art

Traditionally, in order to increase the continuity of the gradient zone of the LED display, the color depth would be increased to eliminate the contour phenomenon. Since increasing the color depth requires higher costs, a dither computing is usually adopted. The dither computing adds various dithering values to grayscale data to make grayscale data changes smoothly, thereby visually equivalently increasing the color depth to compensate for the contour phenomenon.

However, the dither computing results in a flicker phenomenon. The dither computing includes truncating lower bit(s) of original grayscale data that is with the expected bit depth and adding dithering value(s) to the truncated grayscale data, so as to generate a plurality of dithered grayscale data to be displayed according to a given time sequence. Please referring to FIG. 6, which is an exemplary diagram illustrating the flicker phenomenon caused by the dither computing. For example, an expected 15-bits data may be processed by the dither computing to generate a plurality of 13-bits data to be displayed. However, for a pixel location, if expected pixel data remains the same low grayscale such as grayscale data '1' for a long time, as shown in FIG. 6, after dither computing the pixel may display zero grayscale (i.e. dark pixel) most of time and display non-zero grayscale data periodically, thereby the flicker phenomenon is easily perceived by eyes. When the expected pixel data of the entire frame of the LED display are same low grayscale and refresh rate is lower than 60 frames/second, the flicker phenomenon become severe.

SUMMARY

The disclosure is directed to a method for outputting a grayscale data, a driving controller, and a display apparatus, by which the flicker phenomenon can be reduced while the dithering operation is applied.

In an embodiment of the disclosure, a method for outputting a grayscale data in a driving controller of a display apparatus is provided. The method includes: in response to receiving a first input grayscale data which is not greater than a first threshold, generating a first output grayscale data without performing a dither computing on the first input grayscale data and outputting the first output grayscale data; and in response to receiving a second input grayscale data which is greater than a second threshold, generating a first dithered grayscale data by performing a first dither computing on the second input grayscale data and outputting the first dithered grayscale data as a second output grayscale data. The second threshold is greater than the first threshold, and the second output grayscale data does not comprise any part of the second input grayscale data not processed by the first dither computing.

In an embodiment of the disclosure, a driving controller of a display apparatus is provided. The driving controller includes an image processing circuit. In response to that the image processing circuit receives a first input grayscale data which is not greater than a first threshold, the image processing circuit is configured to generate a first output grayscale data without performing a dither computing on the first input grayscale data and configured to output the first output grayscale data. In response to that the image processing circuit receives a second input grayscale data which is greater than a second threshold, and the second threshold is greater than the first threshold, the image processing circuit is configured to generate a first dithered grayscale data by performing a first dither computing on the second input grayscale data and configured to output the first dithered grayscale data as a second output grayscale data. The second output grayscale data does not comprise any part of the second input grayscale data not processed by the first dither computing.

In an embodiment of the disclosure, a display apparatus is provided. The display apparatus includes a pixel array, a data driving circuit, and a driving controller. The data driving circuit is coupled to the pixel array, and the data driving circuit is configured to provide driving signals to drive the pixel array. The driving controller is coupled to the data driving circuit, and the driving controller includes an image processing circuit. In response to that the image processing circuit receives a first input grayscale data which is not greater than a first threshold, the image processing circuit is configured to generate a first output grayscale data without performing a dither computing on the first input grayscale data and configured to output the first output grayscale data. In response to that the image processing circuit receives a second input grayscale data which is greater than a second threshold, and the second threshold is greater than the first threshold, the image processing circuit is configured to generate a first dithered grayscale data by performing a first dither computing on the second input grayscale data and configured to output the first dithered grayscale data as a second output grayscale data. The second output grayscale data does not comprise any part of the second input grayscale data not processed by the first dither computing.

In an embodiment of the disclosure, a display apparatus is provided. The display apparatus includes a pixel array, a driving controller, and a data driving circuit. The driving controller is configured to perform an image processing on a first input grayscale data and a second input grayscale data. The data driving circuit is coupled to the driving controller and the pixel array. The data driving circuit is configured to provide driving signals to drive the pixel array based on a grayscale data output from the driving controller. In response to the first input grayscale data which is not greater than a first threshold, the data driving circuit is configured to output a first driving signal to the pixel array based on a first output grayscale data output from the driving controller. The first output grayscale data is generated without by performing a dither computing on the first input grayscale data. In response to the second input grayscale data which is greater than a second threshold, the data driving circuit is configured to output a second driving signal to the pixel array based on a second output grayscale data output from the driving controller. The second output grayscale data is a dithered grayscale data generated by performing a dither computing on the second input grayscale data.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Embodiments are provided below to describe the disclosure in detail, though the disclosure is not limited to the provided embodiments, and the provided embodiments can be suitably combined. The term “coupling/coupled” or “connecting/connected” used in this specification (including claims) of the application may refer to any direct or indirect connection means. For example, “a first device is coupled to a second device” should be interpreted as “the first device is directly connected to the second device” or “the first device is indirectly connected to the second device through other devices or connection means.” The term “signal” can refer to a current, a voltage, a charge, a temperature, data, electromagnetic wave or any one or multiple signals. In addition, the term “and/or” can refer to “at least one of”. For example, “a first signal and/or a second signal” should be interpreted as “at least one of the first signal and the second signal”.

Figure 1:
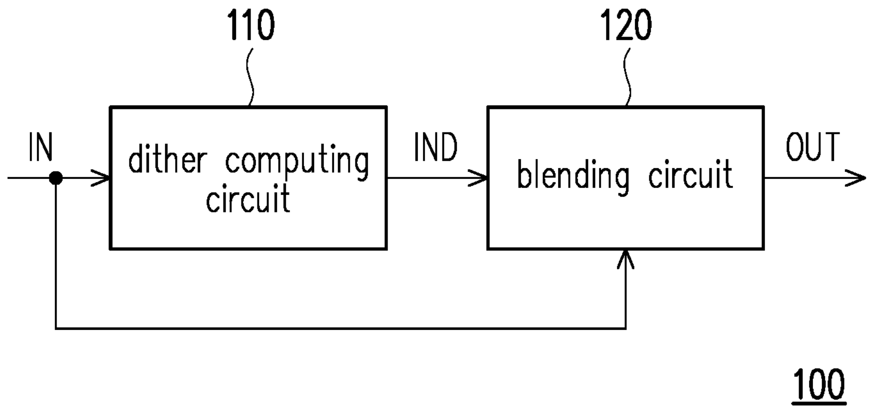
FIG. 1 is a block diagram illustrating an image processing circuit according to an embodiment of the disclosure.

FIG. 1 is a block diagram illustrating an image processing circuit 100 according to an embodiment of the disclosure. The image processing circuit 100 of the present embodiment at least includes a dither computing circuit 110 and a blending circuit 120. In an embodiment, the image processing circuit 100 may be disposed in a driving controller of a display apparatus (shown in FIG. 7). The blending circuit 120 is configurable to be coupled to the dither computing circuit 110.

In the present embodiment, the image processing circuit 100 may be an electronic device having an image processing function. In an embodiment, the image processing circuit 100 may be, but not limited to, a central processing unit (CPU) or a programmable microprocessor, a digital signal processor (DSP), a programmable controller, an application specific integrated circuit (ASIC) or other similar devices or a combination of above-mentioned devices disposed in a driving controller of a light emitting diode (LED) display. The image processing circuit 100 receives input grayscale data IN of an image and performs the image processing function on the input grayscale data IN to generate output grayscale data OUT for improving the continuity of the gradient zone of the image through a digital signal processing. Each of the input grayscale data IN and the output grayscale data OUT may include a set of bits indicating a grayscale value, such as the grayscale 1 and the grayscale 4 shown in FIG. 3B.

Figure 2:
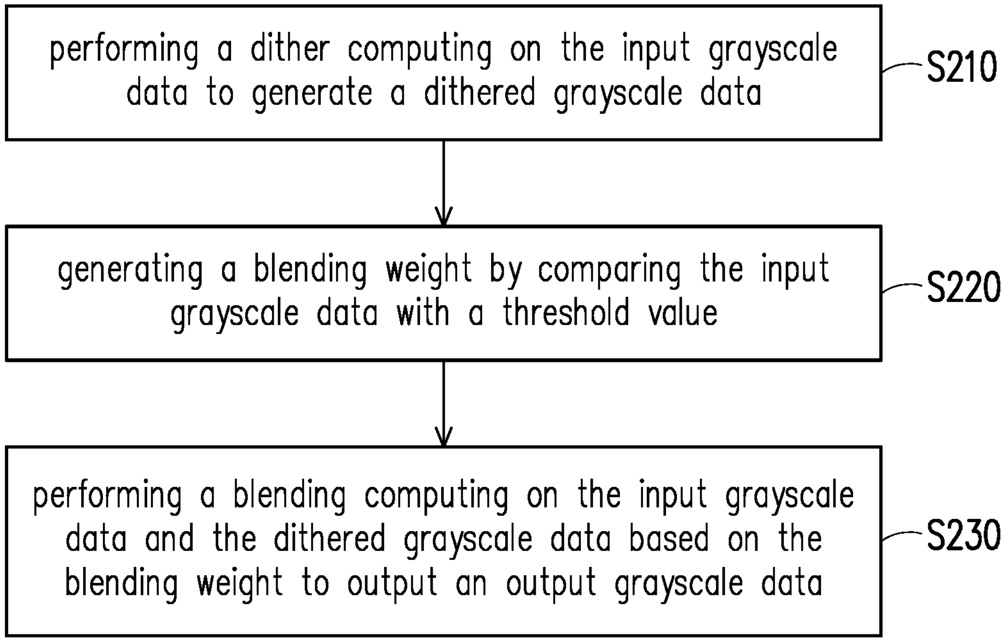
FIG. 2 is a flowchart illustrating an image processing method according to an embodiment of the disclosure.

FIG. 2 is a flowchart illustrating an image processing method according to an embodiment of the disclosure. Referring to FIG. 1 and FIG. 2, in step S210, the dither computing circuit 110 is configured to receive an input grayscale data IN, and perform the dither computing on the input grayscale data IN to generate a dithered grayscale data IND. Specifically, truncating the input grayscale data IN and adding a dithering value to the truncated input grayscale data INT (not shown) are performed during the dither computing, and the detail will be discussed in FIG. 3A and FIG. 3B.

Next, in step S220, the blending circuit 120 receives the input grayscale data IN and dithered grayscale data IND, and the blending circuit 120 compares the dithered grayscale data IND with a first threshold TH1 to generate a blending weight BW. The first threshold TH1 is a reference grayscale for comparing and may be preset according to a design requirement, and the blending weight BW is computed to determine the weights of the input grayscale data IN and the dithered grayscale data IND. Specifically, the blending circuit 120 generates a blending weight BW by means of the dithered grayscale data IND, the first threshold TH1, and a gain value M1. The detail will be discussed in FIG. 4 and FIG. 5.

In step S230, the blending circuit 120 performs a blending computing on the input grayscale data IN and the dithered grayscale data IND based on the blending weight BW to generate an output grayscale data OUT. In particular, the blending circuit 120 computes the output grayscale data OUT by blending the input grayscale data IN and the dithered grayscale data IND through the blending weight BW. The detail will be discussed thereafter.

Figure 3A:
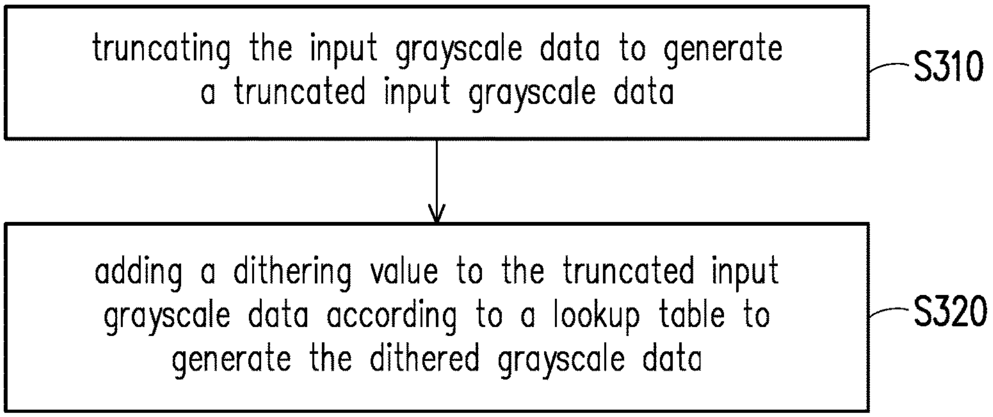
FIG. 3A is a flowchart illustrating the step S210 of FIG. 2 according to an embodiment of the disclosure.
Figure 3B:
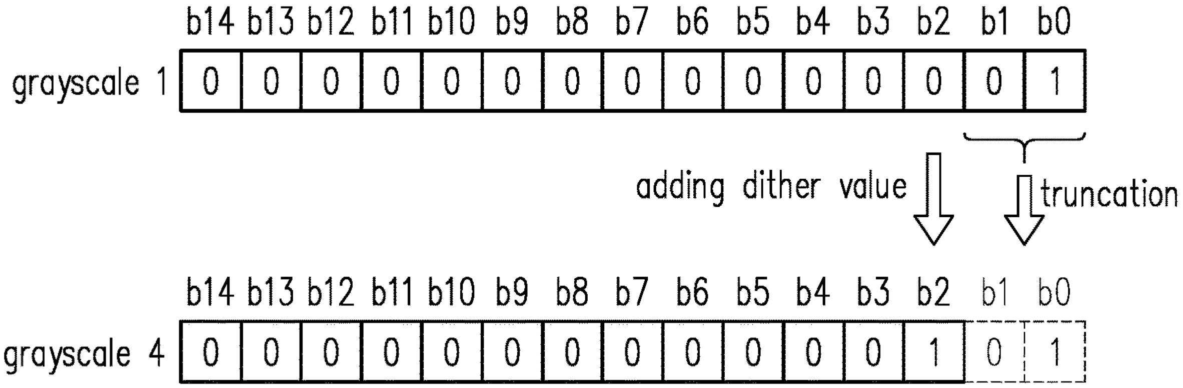
FIG. 3B is an exemplary diagram illustrating the dither computing.

FIG. 3A is a flowchart illustrating the step S210 of FIG. 2 according to an embodiment of the disclosure. Referring to FIG. 3A, in step S310, the dither computing circuit 110 truncates the input grayscale data IN to generate a truncated input grayscale data INT. Specifically, the dither computing circuit 110 truncates a part of bits of the input grayscale data IN, to generate a truncated input grayscale data INT with a less bit number. FIG. 3B is an exemplary diagram illustrating the dither computing. For example, in FIG. 3B, b0 and b1 are truncated so that the color depth is reduced from 15 bits (input grayscale data IN) to 13 bits (truncated input grayscale data INT).

Next, in step S320, the dither computing circuit 110 adds a dithering value to the truncated input grayscale data INT according to a lookup table (LUT), to generate the dithered grayscale data IND. There may be a plurality of dithering values in the lookup table, and the dithering values may be selected sequentially or randomly to be added into the each truncated input grayscale data INT, but not limited. For example, in FIG. 3B, the dithering value 1 is added into b2, so that the 15-bits grayscale 1 is modified to be the 13-bits grayscale 4. As such, the dithered grayscale data IND is generated through the dither computing.

Figure 4:
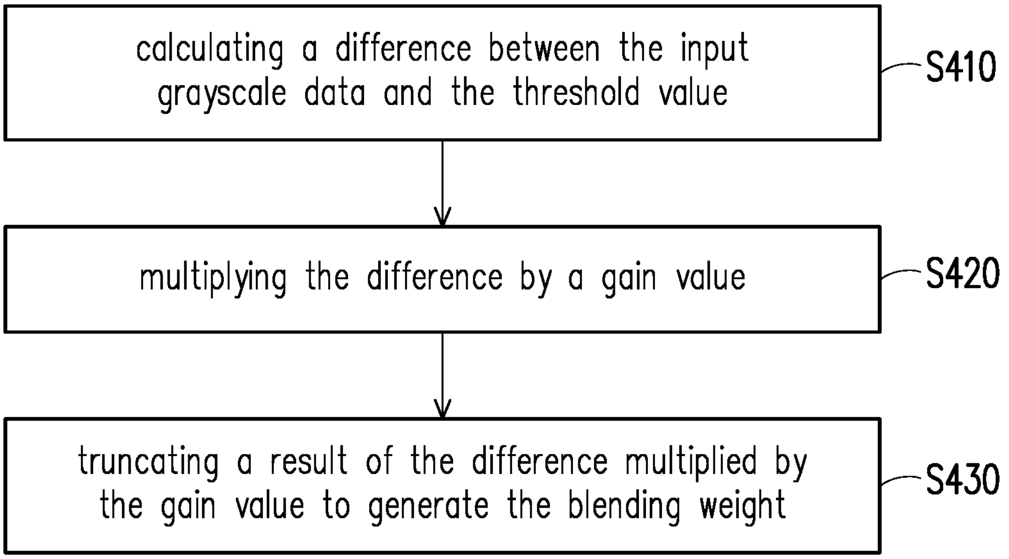
FIG. 4 is a flowchart illustrating the step S220 of FIG. 2 according to an embodiment of the disclosure.
Figure 5:
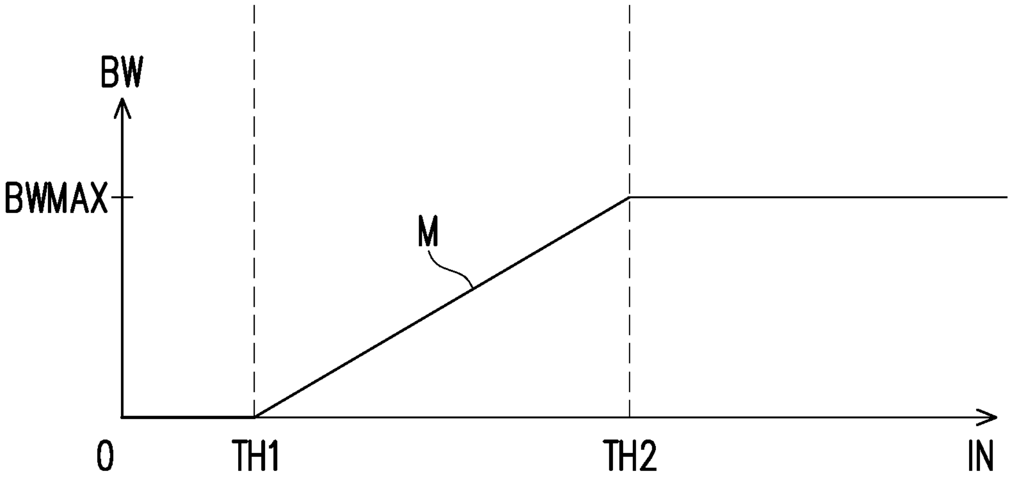
FIG. 5 is an exemplary diagram illustrating the blending weight versus the input grayscale data according to an embodiment of the disclosure.
Figure 6:
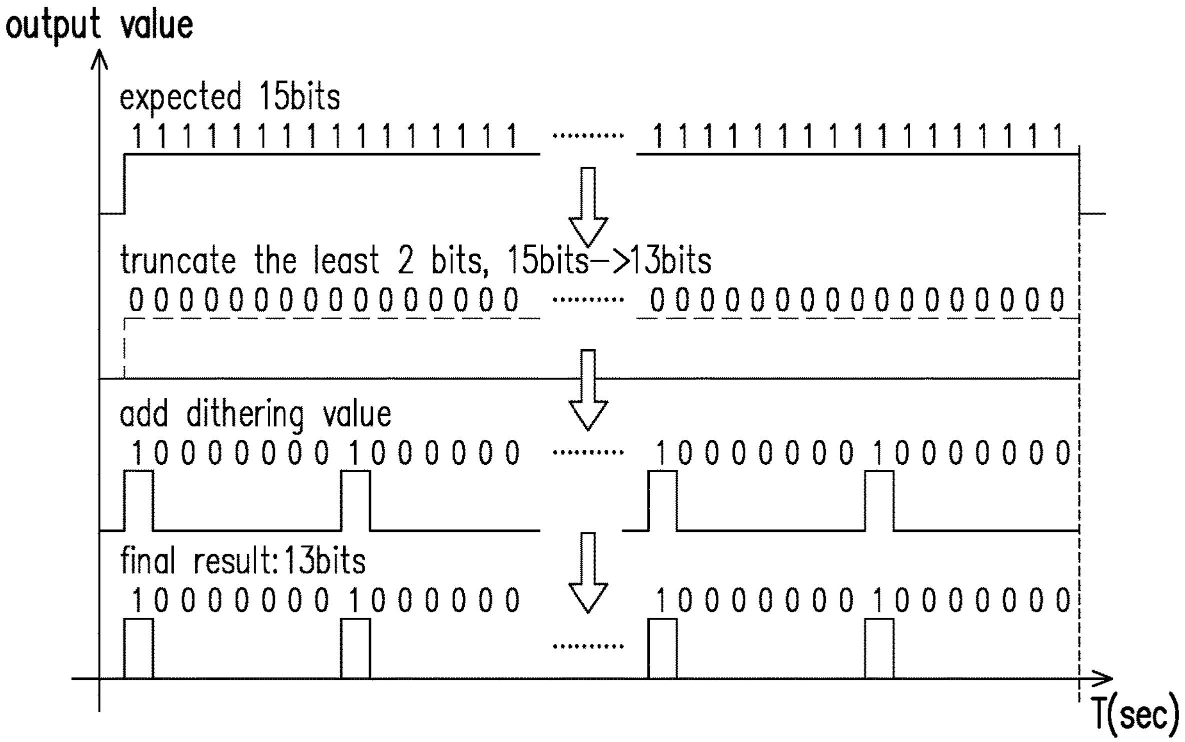
FIG. 6 is an exemplary diagram illustrating the flicker phenomenon caused by the dither computing.

FIG. 4 is a flowchart illustrating the step S220 of FIG. 2 according to an embodiment of the disclosure. Referring to FIG. 4, in step S410, the blending circuit 120 calculates a difference (IN−TH1) between the input grayscale data IN and the first threshold TH1. Next, in step S420, the blending circuit 120 multiplies the difference (IN−TH1) by a gain value M1 to generate a result of (IN−TH1)*M1. The gain value M1 is a reference value and may be preset according to a design requirement. In step S430, the blending circuit 120 truncates the result (IN−TH1)*M1 by X bits to generate the blending weight BW as shown in FIG. 5 and the blending weight BW can be calculated as shown in equation (1). It is noted that the gain value M1>>X is equivalent to a slope M of the blending weight BW versus the input grayscale data IN shown in FIG. 5. Briefly, the blending weight BW can be calculated as shown in equation (1).

$$BW=(IN-TH1)*M1>>X \tag{1}$$

FIG. 5 is an exemplary diagram illustrating the blending weight BW versus the input grayscale data IN according to an embodiment of the disclosure. Please referring to FIG. 5, equation (1) and equation (2), the blending circuit 120 performs a blending computing to generate an output grayscale data OUT according to equation (2):

$$\text{OUT}=\frac{(BW\text{MAX}-BW)*IN+(BW)*IND}{BW\text{MAX}} \tag{2}$$

When the difference (IN−TH1) indicates that the input grayscale data IN is not greater than the first threshold TH1, the blending circuit 120 generates zero as the blending weight BW. When the blending weight BW equals zero, the blending circuit 120 stops the dither computing and directly outputs the input grayscale data IN as the output grayscale data OUT, so as to save computer resource. In other words, when the input grayscale data IN is small enough, the output grayscale data OUT includes less part from the dithered grayscale data IND but includes more part from the input grayscale data IN. When the difference (IN−TH1) indicates that the input grayscale data IN is greater than the first threshold TH1 and not greater the second threshold TH2, the blending weight BW will be gradually increased to a maximum value of the blending weigh BWMAX with the input grayscale data IN, and the slope M of the blending weight BW versus the input grayscale data IN can be obtained through the grain value M1>>X. In other words, when the input grayscale data IN is greater, there is more part from the dithered grayscale data IND (while less part from the input grayscale data IN) included in the output grayscale data OUT.

When the difference (IN−TH1) indicates that the input grayscale data IN is greater than a second threshold TH2 (by comparing (IN−TH1) with (TH2−TH1)), the blending circuit 120 generates the predetermined value as the blending weight BW. It is noted that the maximum value of the blending weight BWMAX and the gain value M are preset according design requirements, and the second threshold TH2 could be computed by means of the first threshold TH1, the maximum value of the blending weight BWMAX and the gain value M.

When the blending weight BW equals a predetermined value which is the maximum value of the blending weigh BWMAX, the blending circuit 120 outputs the dithered grayscale data IND as the output grayscale data OUT, so as to save computer resource.

Figure 7:
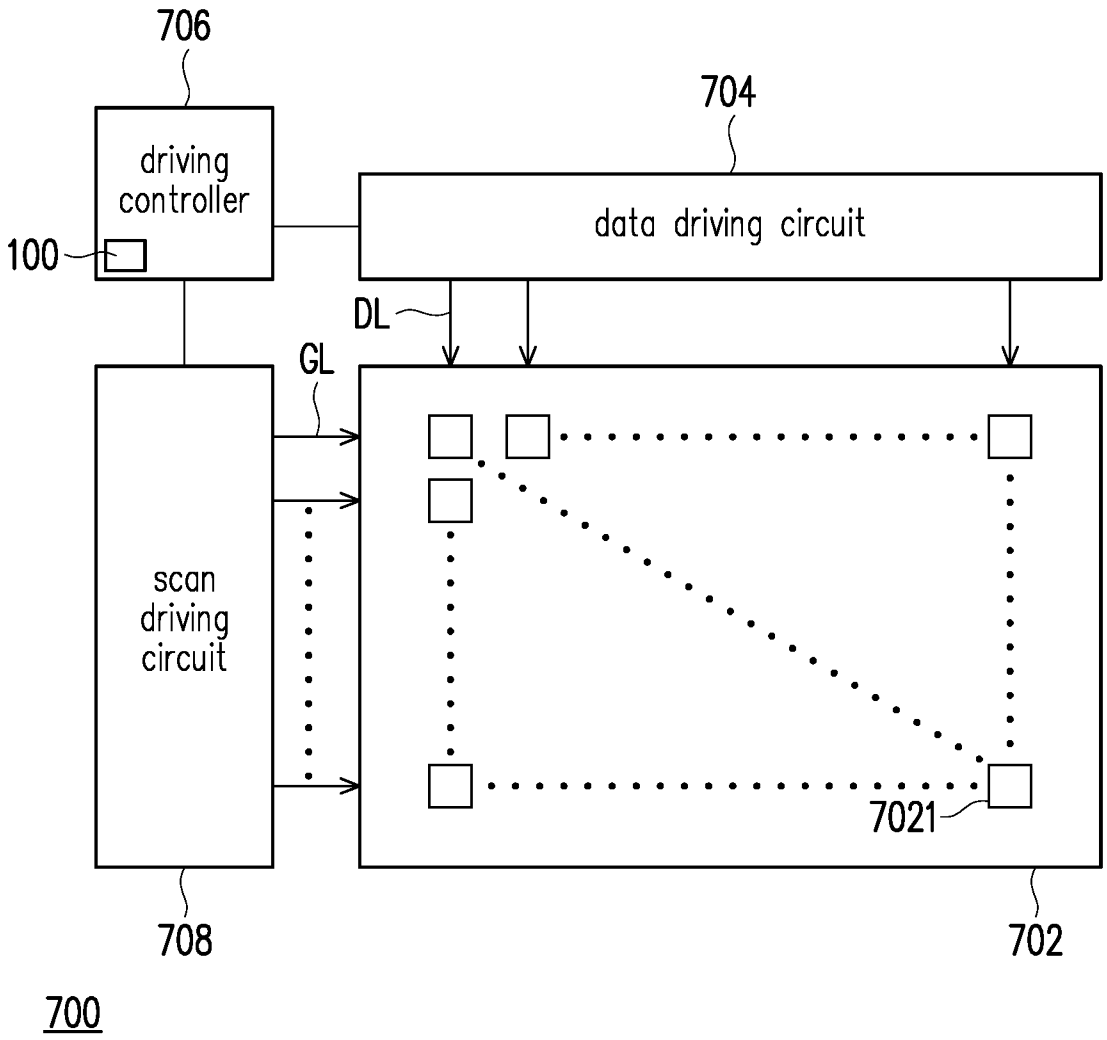
FIG. 7 is a block diagram illustrating a display apparatus according to an embodiment of the disclosure.

FIG. 7 is a block diagram illustrating a display apparatus 700 according to an embodiment of the disclosure. Referring to FIG. 7, the display apparatus 700 includes a pixel array 702, a data driving circuit 704, a driving controller 706, and a scan driving circuit 708. According to design requirements, the driving controller 706, the data driving circuit 704, and the scan driving circuit 708 may be integrated as a single chip, or the driving controller 706, the data driving circuit 704, and the scan driving circuit 708 may be arranged as three separate chips. In one embodiment, the driving controller 706 and the data driving circuit 704 may be integrated as a single chip. In another embodiment, the driving controller 706 and the scan driving circuit 708 may be integrated as a single chip.

As shown in FIG. 7, the driving controller 706 is coupled to the data driving circuit 704 and the scan driving circuit 708. The driving controller 706 may control the scan driving circuit 708 to transmit scan signals through scan lines GL to the pixel array 702, and control the data driving circuit 704 to transmit driving signals through data lines DL to the pixel array 702. Therefore, each of the pixels 7021 in the pixel array can be driven to emit light based on the scan signals and the driving signal. The display apparatus 700 may be realized as a large light emitting diode (LED) display used in a commercial center or live sport game broadcast, or realized as an organic light emitting diode (OLED) display used in consumer electronic devices, such as smart phone, tablet computer, notebook, and television. Based on the applications of the display apparatus 700, the data driving circuit 704 may provide driving currents as driving signals or provide driving voltage as driving signals. For example, when the display apparatus 700 serves as a large LED display, the data driving circuit 704 may be a constant current driver providing driving currents to drive the pixel array 702. The data driving circuit 704 in the large LED display may be formed by a cascade of two or more data driving integrated circuits (ICs). When the display apparatus 700 serves as an OLED display used in consumer electronic devices, the data driving circuit 704 may provide driving voltages to drive the pixel array 702.

The driving controller 706 may perform an image processing on an input grayscale data, and the data driving circuit 704 may provide driving signals to drive the pixel array 702 based on a processed grayscale data output from the driving controller 706. For example, the driving controller 706 in FIG. 7 may include an image processing circuit 100 shown in FIG. 1. The output signal of the image processing circuit 100 is generated according to the grayscale value of the input grayscale data received by the image processing circuit 100, which is demonstrated in FIG. 8.

Figure 8:
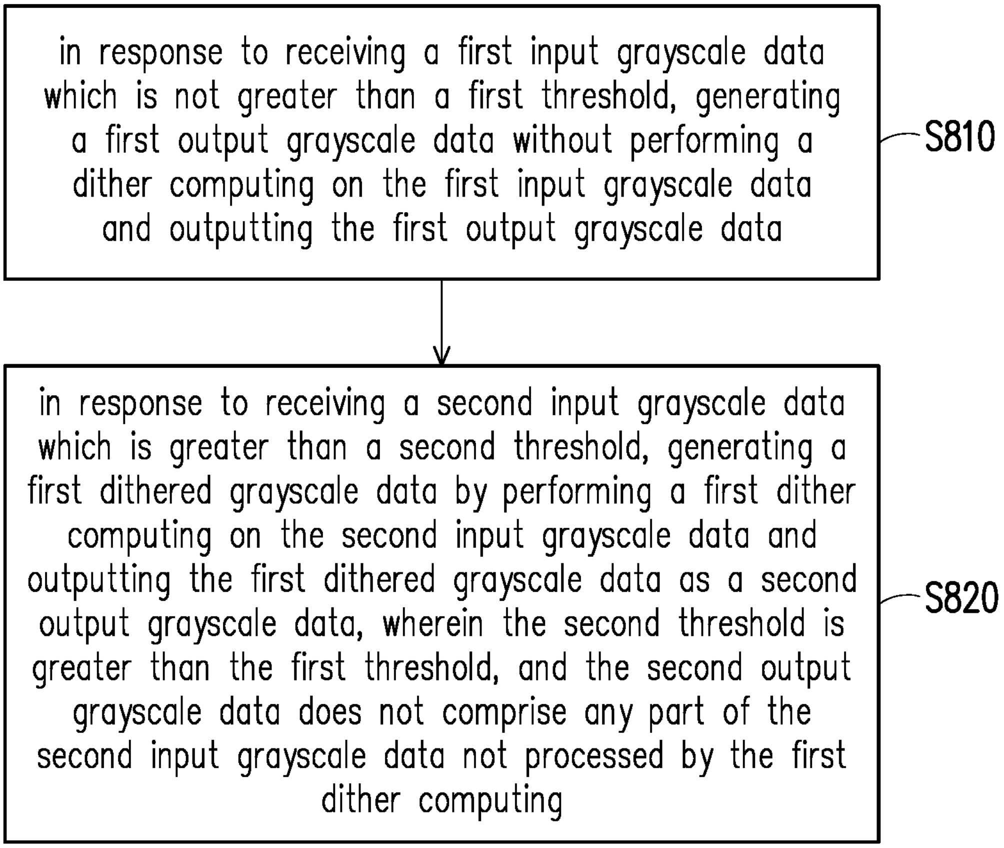
FIG. 8 is a flowchart illustrating a method for outputting a grayscale data according to an embodiment of the disclosure.

FIG. 8 is a flowchart illustrating a method for outputting a grayscale data according to an embodiment of the disclosure. Referring to FIG. 1 and FIG. 8, in response to that the image processing circuit 100 in step S810 receives an input grayscale data IN (i.e. first input grayscale data) which is not greater than a first threshold (i.e. the input grayscale data IN has a grayscale value smaller than the first threshold), the image processing circuit 100 of the driving controller 706 may generate an output grayscale data OUT without performing a dither computing on the input grayscale data IN (i.e. first input grayscale data) and output the output grayscale data OUT (i.e. first output grayscale data). In other words, the image processing circuit 100 outputs the output grayscale data OUT which equals the input grayscale data IN (i.e. first input grayscale data). In the aspect of the data driving circuit, in response to the first input grayscale data which is not greater than the first threshold, the data driving circuit outputs a first driving signal to the pixel array based on the output grayscale data OUT (first output grayscale data) output from the driving controller.

In step S820, in response to that the image processing circuit 100 receives an input grayscale data IN (i.e. second input grayscale data) which is greater than a second threshold (i.e. the input grayscale data IN has a grayscale value greater than the second threshold), the image processing circuit 100 may generate a dithered grayscale data IND by performing a dither computing on the input grayscale data IN (i.e. second input grayscale data) and directly output the dithered grayscale data IND as the output grayscale data OUT (i.e. second output grayscale data). It should be noted that the second threshold is greater than the first threshold, and the output grayscale data OUT in step S820 does not comprise any part of the input grayscale data IN (i.e. second input grayscale data) not processed by the dither computing. In the aspect of the data driving circuit, in response to the input grayscale data IN (second input grayscale data) which is greater than the second threshold, the data driving circuit outputs a second driving signal to the pixel array based on the output grayscale data OUT (i.e. second output grayscale data which is equal to the dithered grayscale data IND) output from the driving controller.

Specifically, the image processing circuit 100 may have three operation modes. Referring to FIG. 1, the image processing circuit 100 includes a dither computing circuit 110 and a blending circuit 120 coupled to the dither computing circuit 110. In a first operation mode, both the dither computing circuit 110 and the blending circuit 120 receive a first input grayscale data IN which is not greater than a first threshold. Therefore, in the first operation mode, the dither computing circuit 110 is disabled, and the blending circuit 120 outputs the first output grayscale data OUT which equals the first input grayscale data IN. In a second operation mode, both the dither computing circuit 110 and the blending circuit 120 receive a second input grayscale data IN which is greater than a second threshold, and the second threshold is greater than the first threshold. Therefore, in the second operation mode, the dither computing circuit 110 performs the dither computing on the second input grayscale data IN to generate a first dithered grayscale data IND, and the blending circuit 120 directly outputs the first dithered grayscale data IND received from the dither computing circuit 110 as a second output grayscale data OUT without blending the second input grayscale data IN.

In a third operation mode, both the dither computing circuit 110 and the blending circuit 120 receive a third input grayscale data IN which is greater than the first threshold and not greater the second threshold. Therefore, in the third operation mode, the dither computing circuit 110 performs the dither computing on the third input grayscale data IN to generate a second dithered grayscale data IND, and the blending circuit 120 performs a blending computing on the third input grayscale data IN and the second dithered grayscale data IND received from the dither computing circuit 110 to generate a blended grayscale data, and outputs the blended grayscale data as the third output grayscale data OUT.

Based on above, the blending computing of the disclosure decreases the dither ratio under the low input grayscale, leading to reduce the flicker phenomenon shown in LED display. Therefore, the side effect of the dither computing would be solved with a smooth gradient zone, so as to improve the user experience.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display apparatus, comprising:

a pixel array;

a driving controller, configured to perform an image processing on a first input grayscale data and a second input grayscale data;

a data driving circuit, coupled to the driving controller and the pixel array, wherein the data driving circuit is configured to provide driving signals to drive the pixel array based on a grayscale data output from the driving controller, wherein in response to the first input grayscale data which has a first grayscale value not greater than a first threshold, the data driving circuit is configured to output a first driving signal to the pixel array based on a first output grayscale data output from the driving controller, wherein the first output grayscale data is generated without by performing a first dither computing on the first input grayscale data; and wherein in response to the second input grayscale data which has a second grayscale value greater than a second threshold, and a grayscale value of the second threshold is greater than a grayscale value of the first threshold, the data driving circuit is configured to output a second driving signal to the pixel array based on a second output grayscale data output from the driving controller, wherein the second output grayscale data is a dithered grayscale data generated by performing a second dither computing on the second input grayscale data.

2. A display apparatus, comprising:

a pixel array;

a data driving circuit, coupled to the pixel array, wherein the data driving circuit is configured to provide driving signals to drive the pixel array; and a driving controller, coupled to the data driving circuit, wherein the driving controller comprises an image processing circuit, wherein in response to that the image processing circuit receives a first input grayscale data which has a first grayscale value not greater than a first threshold, the image processing circuit is configured to generate a first output grayscale data without performing a dither computing on the first input grayscale data and configured to output the first output grayscale data; and wherein in response to that the image processing circuit receives a second input grayscale data which has a second grayscale value greater than a second threshold, and a grayscale value of the second threshold is greater than a grayscale value of the first threshold, the image processing circuit is configured to generate a first dithered grayscale data by performing a first dither computing on the second input grayscale data and configured to output the first dithered grayscale data as a second output grayscale data, wherein the second output grayscale data does not comprise any part of the second input grayscale data not processed by the first dither computing.

3. The display apparatus as claimed in claim 2, wherein the image processing circuit comprises a dither computing circuit and a blending circuit coupled to the dither computing circuit, wherein in response to that both the dither computing circuit and the blending circuit receive the first input grayscale data which is not greater than the first threshold, the dither computing circuit is disabled, and the blending circuit outputs the first output grayscale data which equals the first input grayscale data;

wherein in response to that both the dither computing circuit and the blending circuit receive the second input grayscale data which is greater than the second threshold, the dither computing circuit performs the first dither computing on the second input grayscale data to generate the first dithered grayscale data, and the blending circuit outputs the first dithered grayscale data received from the dither computing circuit as the second output grayscale data.

4. The display apparatus as claimed in claim 3, wherein in response to that both the dither computing circuit and the blending circuit receive a third input grayscale data which is greater than the first threshold and not greater the second threshold, the dither computing circuit performs the second dither computing on the third input grayscale data to generate the second dithered grayscale data, and the blending circuit performs a blending computing on the third input grayscale data and the second dithered grayscale data received from the dither computing circuit to generate a blended grayscale data, and outputs the blended grayscale data as the third output grayscale data.

5. A driving controller of a display apparatus, comprising an image processing circuit, wherein in response to that the image processing circuit receives a first input grayscale data which has a first grayscale value not greater than a first threshold, the image processing circuit is configured to generate a first output grayscale data without performing a dither computing on the first input grayscale data and configured to output the first output grayscale data; and wherein in response to that the image processing circuit receives a second input grayscale data which has a second grayscale value greater than a second threshold, and a grayscale value of the second threshold is greater than a grayscale value of the first threshold, the image processing circuit is configured to generate a first dithered grayscale data by performing a first dither computing on the second input grayscale data and configured to output the first dithered grayscale data as a second output grayscale data, wherein the second output grayscale data does not comprise any part of the second input grayscale data not processed by the first dither computing.

6. The driving controller as claimed in claim 5, wherein the image processing circuit comprises a dither computing circuit and a blending circuit coupled to the dither computing circuit, wherein in response to that both the dither computing circuit and the blending circuit receive the first input grayscale data which is not greater than the first threshold, the dither computing circuit is disabled, and the blending circuit outputs the first output grayscale data which equals the first input grayscale data;

wherein in response to that both the dither computing circuit and the blending circuit receive the second input grayscale data which is greater than the second threshold, the dither computing circuit performs the first dither computing on the second input grayscale data to generate the first dithered grayscale data, and the blending circuit outputs the first dithered grayscale data received from the dither computing circuit as the second output grayscale data.

7. The driving controller as claimed in claim 6, wherein in response to that both the dither computing circuit and the blending circuit receive a third input grayscale data which is greater than the first threshold and not greater the second threshold, the dither computing circuit performs the second dither computing on the third input grayscale data to generate the second dithered grayscale data, and the blending circuit performs a blending computing on the third input grayscale data and the second dithered grayscale data received from the dither computing circuit to generate a blended grayscale data, and outputs the blended grayscale data as the third output grayscale data.

8. A method for outputting a grayscale data in a driving controller of a display apparatus, the method comprising:

in response to receiving a first input grayscale data which has a first grayscale value not greater than a first threshold, generating a first output grayscale data without performing a dither computing on the first input grayscale data and outputting the first output grayscale data; and in response to receiving a second input grayscale data which has a second grayscale value greater than a second threshold, generating a first dithered grayscale data by performing a first dither computing on the second input grayscale data and outputting the first dithered grayscale data as a second output grayscale data, wherein a grayscale value of the second threshold is greater than a grayscale value of the first threshold, and the second output grayscale data does not comprise any part of the second input grayscale data not processed by the first dither computing.

9. The method as claimed in claim 8, wherein in response to receiving the first input grayscale data which is not greater than the first threshold, outputting the first output grayscale data which equals the first input grayscale data.

10. The method as claimed in claim 8, wherein in response to receiving a third input grayscale data which is greater than the first threshold and not greater the second threshold, the method further comprising:

generating a second dithered grayscale data by performing a second dither computing on the third input grayscale data; and generating a blended grayscale data by performing a blending computing on the third input grayscale data and the second dithered grayscale data and outputting the blended grayscale data as a third output grayscale data.

* * * * *